United States Patent

Nilsson

[11] Patent Number: 5,960,931
[45] Date of Patent: Oct. 5, 1999

[54] FEED ROLLER HAVING OUTER MANTLE RESILIENTLY SUPPORTED ON INNER BODY

[75] Inventor: Gunnar Nilsson, Umeå, Sweden

[73] Assignee: Sisu Logging AB, Umea, Sweden

[21] Appl. No.: 08/765,144

[22] PCT Filed: Jun. 22, 1995

[86] PCT No.: PCT/SE95/00770

§ 371 Date: Dec. 23, 1996

§ 102(e) Date: Dec. 23, 1996

[87] PCT Pub. No.: WO96/00141

PCT Pub. Date: Jan. 4, 1996

[30] Foreign Application Priority Data

Jun. 23, 1994 [SE] Sweden .................................. 9402235

[51] Int. Cl.⁶ .................................................. B65G 29/00
[52] U.S. Cl. ............................................. 198/624; 193/37
[58] Field of Search ..................................... 198/620, 624, 198/604; 193/37; 144/248.3, 248.7

[56] References Cited

U.S. PATENT DOCUMENTS

| | | | |
|---|---|---|---|
| 4,901,778 | 2/1990 | Fenton | 198/624 X |
| 5,152,328 | 10/1992 | Arvidsson | 198/624 X |
| 5,570,732 | 11/1996 | Andreasson | 198/624 X |
| 5,580,043 | 12/1996 | Gelb, Jr. et al. | 198/624 X |

*Primary Examiner*—James R. Bidwell
*Attorney, Agent, or Firm*—Pillsbury Madison & Sutro LLP

[57] ABSTRACT

A tree-trunk feed roller of a log harvesting unit includes a mantle for engaging the tree trunk, arranged in one piece around a body. In the space radially provided between these elements, one set of dogging elements is mounted on the mantle, and another set is mounted on the body, such that dogging elements of the respective sets alternate. Resilient elements are engaged between each two dogging elements from the opposite sets, such that the dogging elements and resilient elements are arranged to transmit radial and peripheral forces acting between the body and the mantle.

9 Claims, 2 Drawing Sheets

FEED ROLLER HAVING OUTER MANTLE RESILIENTLY SUPPORTED ON INNER BODY

This application is the national phase of international application PCT/SE95/00770 filed Jun. 22, 1995 which designated the U.S.

BACKGROUND OF THE INVENTION

The present invention relates to a shock-absorbing feed roller and more particularly to an adjustable, resiliently carried feed roller for use in a tree-harvesting unit connected to a forest processor.

Modern logging operations are carried out with the aid of advanced logging processors, so-called harvesters, provided with a tree-harvesting unit. The harvesting unit fells, trims and cuts trees into desired lengths.

When a tree is felled, the root end of the tree trunk is held inserted between drive wheels or feed rollers which clamp around the trunk on opposite sides thereof. The trunk is then trimmed by feeding the trunk through the harvesting unit with the aid of the feed rollers, the harvesting unit comprising appropriately disposed knives for removing knots, branches, etc., from the trunk. In order to achieve a fully satisfactory trimming result, it is important that the feed rollers grip the trunk satisfactorily. It is known to provide the feed rollers with studs, teeth, ribs or like gripping means which are intended to penetrate through the bark and grip or bite into the surface wood of the log, so as to eliminate the risk of the rollers slipping as bark is loosened from the surface wood. The force with which the feed roller engages the log is also important in achieving a satisfactory grip.

The feed rollers thus operate with forces that act both radially, i.e. grip-improving clamping forces against the trunk, and forces which act peripherally, i.e. feed forces generated by the torque of the drive arrangement.

An early known feed roller or feed wheel is manufactured totally from steel and is provided around its outer surface with studs or ribs which are intended to penetrate through the bark on the log so as to achieve a better grip in the surface wood of the log. The drawback with this feed wheel is that it is rigid and non-resilient, such that the wheel, or roller, will strike against the trunk with considerable force as the wheel passes irregularities along the surface of the trunk. This drawback is the result of the high clamping forces with which the feed wheels are engaged with the trunk and that are required in order to obtain a satisfactory grip, and because of the inability of the feed wheels to absorb impacts. The impact of the inelastic and rigid wheel against the tree trunk results in damage to the surface wood, which, in turn detracts from the price that can be demanded for the harvested timber. Notwithstanding this, however, this latter type of feed wheel has the advantage of a long useful life.

A feed wheel used at present includes a steel hub on which a rubber covering or rubber tread is affixed by vulcanization. This feed wheel has a gentler effect on the trunk, since the rubber tread functions to absorb shocks and impact forces as the wheel strikes against the trunk. The rubber-covered wheels are normally provided with chain-type grippers, so as to obtain an effective grip with the trunk. However, a feed wheel that has a rubber covering has a much shorter useful life than a wheel that has a steel outer periphery. Furthermore, in the case of a rubber-covered wheel, it is necessary to dismantle the entire wheel in order to replace the rubber covering or rubber tread, a task which normally has to be carried out on factory premises.

A forest processor normally works over large areas of forest and is liable to come into contact with several different types of trees. This means that the properties of the wood and of the bark are also liable to vary, therewith requiring the feed rollers, or wheels, to be adaptable to relevant requirements. At present, it is not possible to vary the resilient properties of feed rollers or feed wheels in a quick and simple fashion, or to vary the design of the gripping elements and their sizes, etc.

SUMMARY OF THE INVENTION

An object of the present invention is to provide a feed roller which combines the advantages afforded by a rigid mantle or shell and a shock-absorbing feed roller.

Another object of the present invention is to provide a feed roller which can be dismantled and adapted to the properties or characteristics of the trees to be felled and processed.

BRIEF DESCRIPTION OF THE DRAWINGS

The invention will now be described in more detail with reference to the accompanying drawings, in which.

DETAILED DESCRIPTION

Figure 1:
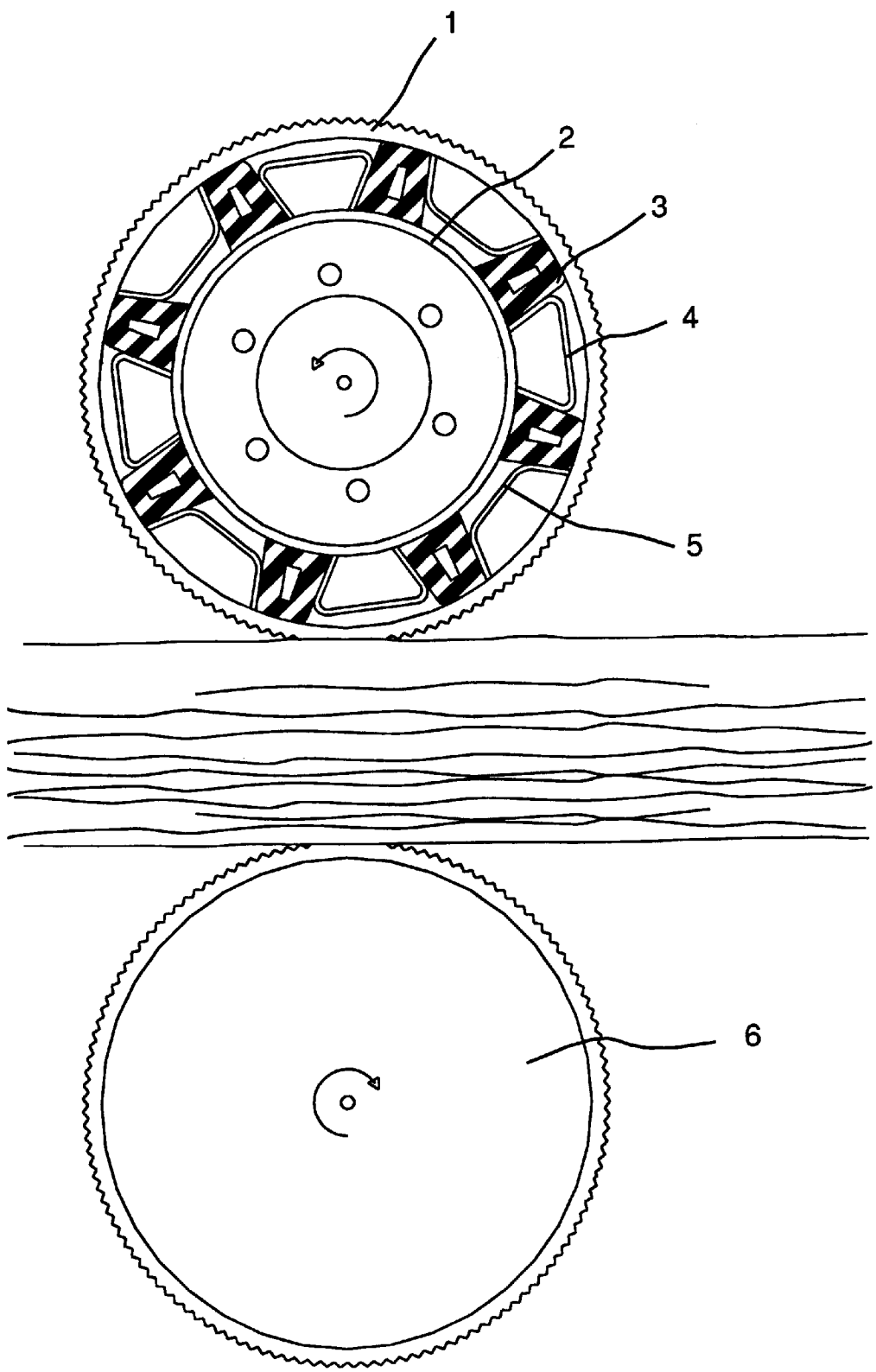
FIG. 1 is a schematic, partially sectioned view of a tree trunk gripped between two feed rollers according to one embodiment of the present invention.

The drawings illustrate a feed roller according to one embodiment of the present invention, intended for use in a harvesting unit of a forest processor. The feed roller includes a body 2 which is connected to a feed-roller drive means (not shown), an outer shell or mantle 1 disposed around the body 2 and encircling the rotational axis of said body and intended for engagement with the trunk of a tree, and resilient elements 3 which are disposed in a radially extending space or gap defined by the body and the mantle. The resilient elements 3 separate the body from the mantle and are arranged loosely between dogging devices 4, 5 in the radial space between the body and the mantle. The dogging elements have the form of projections that are mounted alternately on the body 2 and on the mantle 1. The body-mounted dogging elements 4 and the mantle-mounted dogging elements 5 coact with the resilient elements 3 in a manner to transmit torque and radially acting pressure forces between the body 2 and the mantle 1.

Each dogging element 4, 5 in the space between the body 2 and the mantle 1 has a radial extension which is smaller than the radial extension of the space between the body 2 and the mantle 1. This enables the body 2 and the mantle 1 to move radially in relation to one another. The dogging elements 4, 5 are disposed uniformly around the circumference of the space or gap and are attached to the body 2 and the mantle 1 in an alternating sequence.

According to one preferred embodiment of the invention, the outer mantle 1 is made of steel and the body has the form of a driven steel hub 2, while the flexible transmission elements arranged loosely therebetween have the form of elongated rubber strips 3. The rubber strips 3 are disposed parallel with the feed-roller drive axle and distance the steel mantle 1 from the steel hub 2.

The feed roller also includes end covers 6 which function to seal the axially located ends of the feed roller—more specifically to seal the orifices of the space at the ends of the feed roller—and also to prevent displacement of the loosely lying resilient elements in an axial direction.

The driven steel hub 2 is comprised of a tubular rotatable body which is provided internally with means for coupling the body to the drive means, and is provided externally with the dogging elements 4.

Figure 2:
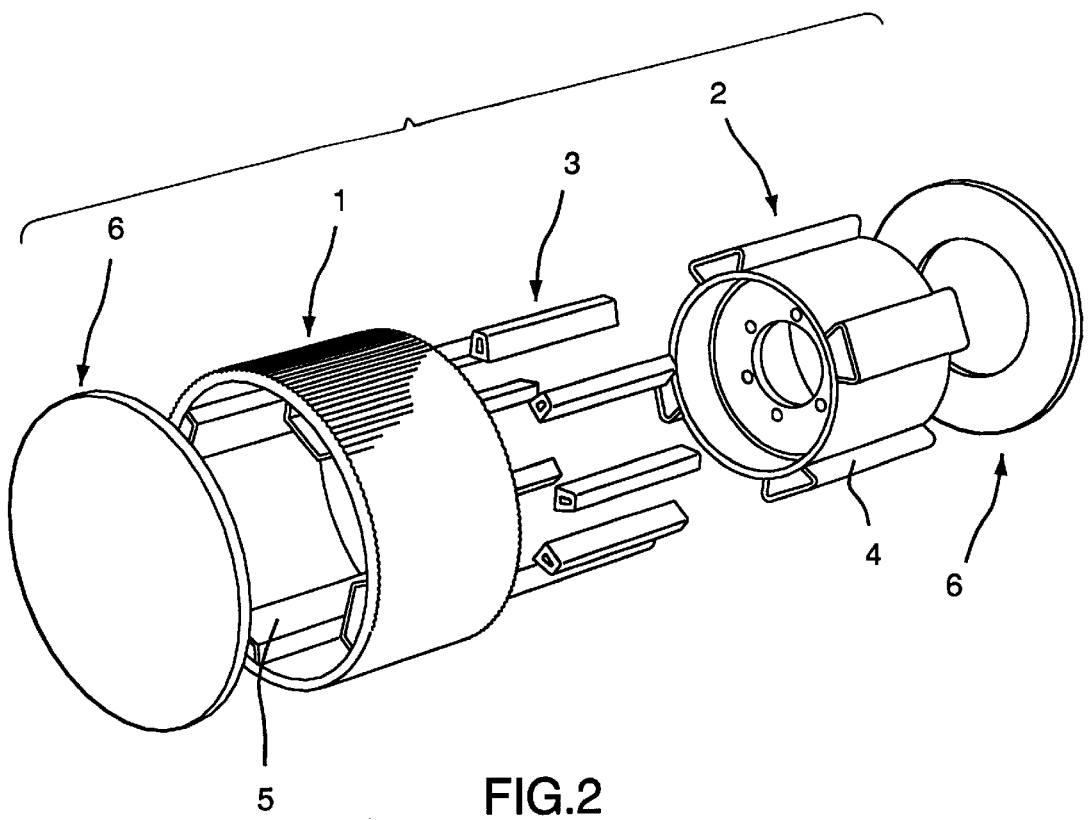
FIG. 2 is a perspective view of the feed roller shown in FIG. 1 in a dismantled state.

The force-transmitting dogging elements 4 disposed on the outer periphery of the body 2 have at least one abutment surface for abutment with a resilient element 3. The dogging elements 4 may have the form of profiled strips positioned parallel with the hub drive axle and distributed uniformly around the periphery of the body. As shown in FIGS. 1 and 2, four elongated profiled strips having a frusto-conical cross-sectional shape are distributed uniformly around the rotational body 2 at 90° intervals. The profiled strips are fastened at their top ends to the body, wherein the flanks of the strips define gently angled abutment surfaces relative to a radius. The design of the dogging element 4 is connected intimately with the design of the elastic elements 3 to be used, as explained in more detail below.

The outer mantle 1 includes a rotational body which has gripping elements around its peripheral surface. The design and orientation of the gripping elements is influenced by the characteristics of the type of wood to be advanced by the feed rollers, and may, for instance, have the form of square-section bars arranged parallel with the drive axle.

The mantle 1, which in the case of the illustrated embodiment is a one-piece structure, has an internal diameter which is larger than the outer diameter of the hub 2, such as to define radially a space therebetween. The mantle 1 is provided internally with a number of radially and inwardly extending force-transmitting projections 5 which correspond to the hub-mounted dogging elements. In the case of the embodiment shown in FIGS. 1 and 2, four elongated, profiled strips 5 having a frusto-conical cross-section are uniformly distributed around the inner periphery of the mantle 1 at 90° intervals. The base side of each profiled strip 5 is fastened to the inner surface of the mantle, wherein the flank sides of the strips form a gently angled abutment surface in relation to a radius. The profile shape of the dogging element has intimate connection with the design of the resilient element, as will be described in more detail below.

In order to prevent the feed roller from becoming unserviceable with regard to its function of advancing a trunk or braking its forward movement when the feed roller is overloaded or the elastic elements 3 become worn, the dogging elements 4, 5 are given an extension such that mutually adjacent dogging elements 4 and 5 will engage one another even in the absence of intermediate resilient elements, i.e. an extension such that their common total extension will exceed the radial extension of the space defined between the body and the mantle. In one preferred embodiment of the invention, the dogging elements have an extension which exceeds half the extension of that radial space.

The inventive feed roller is assembled by first fitting the mantle 1 on the hub 2, wherewith the dogging elements 4 of the hub 2 will be located in that radial space between a pair of the dogging elements 5 on the mantle 1, and vice versa. Rubber strips 3 are then inserted between the dogging elements 4, 5 in that radial space, whereafter the end covers 6 are fitted.

Figure 3:
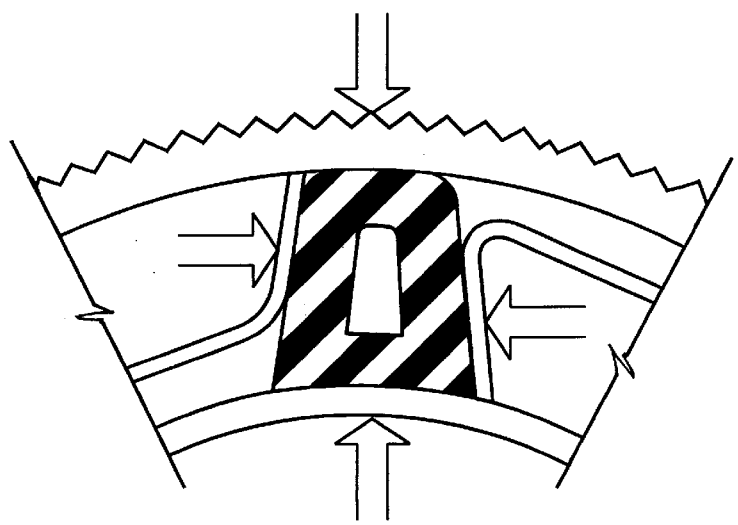
FIG. 3 is a schematic, enlarged view of an elastic element mounted in the feed roller shown in FIG. 1.

According to the invention, the resilient elements may advantageously have the form of standard rubber strips having a standard profile and cut into suitable lengths. Such standard-profile strips are shown in FIGS. 1, 2 and 3.

The resilient elements 3 shall provide four force-transmission abutment surfaces, one acting towards the hub 2, one acting towards the mantle 1, one acting towards the hub-mounted dogging elements 4 and one directed to the mantle-mounted dogging elements 5, and when in a non-activated state will lie against all of these surfaces. The resilient elements 3 thus fully separate the mantle from the hub.

There is thus provided a feed roller which is able to absorb shocks and impact forces that act in a radial direction, in accordance with the resilient properties of the resilient elements. Because peripherally acting forces are also transmitted between hub and mantle by means of elastic elements, shocks and impact forces are also dampened in this respect.

The elastic elements 3 may advantageously have a hollow cross-section, thereby enabling the elastic properties of each strip to be varied and modified without needing to replace the elements, by inserting stabilizing elements into the hollow resilient elements. Another advantage is that the elastic elements, the rubber strips, may be given a slightly smaller cross-section to facilitate fitting, whereafter an expander element can be fitted into the hollow interior of each elastic element in order to expand the element in cross-section. The outer sides of respective elastic elements thus placed against all surrounding abutment surfaces on dogging elements, body and mantle.

The feed roller of the aforedescribed embodiment thus includes a wear-resistant, durable steel mantle which can be provided externally with suitable gripping devices and which has shock-absorbing properties.

Another advantage afforded by the inventive feed roller is that because the roller can be dismantled the roller can be displaced and modified. For instance, the mantle can be easily replaced on the felling and logging site when necessary, and the rubber elements can be replaced without needing to disconnect the hub from the drive means. This simplifies the servicing and maintenance of the feed roller and enables the feed rollers, or wheels, to be adapted to the characteristics of the trees concerned.

I claim:

1. A tree-trunk feed roller for a log harvesting unit, said feed roller comprising:

a body driven around a rotational axis;

a mantle for engagement with a trunk or log, said mantle being arranged in one piece around said body so as to define a radial space therewith;

resilient elements which are removable arranged between a plurality of dogging elements disposed uniformly in said space and affixed alternately to said body and to said mantle, respectively as body-mounted dogging elements and mantle-mounted dogging elements;

said dogging elements having a radial extent which is smaller than the radial extent of the space between said body and said mantle and exceeds half the radial extent of said radial space; and said dogging elements coacting with said resilient elements to transmit radial and peripheral forces acting between said body and said mantle.

2. A feed roller according to claim 1, wherein:

said elements are elongated profiled strips which extend parallel with said rotational axis and are generally trapezoidal in transverse cross-sectional shape so as to each have a broader and a narrower parallel side.

3. A feed roller according to claim 2, wherein:

said body-mounted dogging elements are affixed to the body at the narrower sides of the profiled strips; and said mantle-mounted dogging elements are affixed to said mantle at the broader sides of said profiled strips.

4. A feed roller according to claim 1, wherein:

each resilient element is an elongated rubber strip.

5. A feed roller according to claim 4, wherein:

each resilient element is hollow such as to enable insertion thereinto of a stabilizing element for altering properties of the respective said element.

6. A feed roller according to claim 2, wherein:

each resilient element is an elongated rubber strip.

7. A feed roller according to claim 6, wherein:

each elongated resilient element is hollow such as to enable insertion thereinto of a stabilizing element for altering properties of the respective said resilient element.

8. A feed roller according to claim 3, wherein:

each resilient element is an elongated rubber strip.

9. A feed roller according to claim 8, wherein:

each elongated resilient element is hollow such as to enable to insertion thereinto of a stabilizing element for altering properties of the respective said resilient element.

* * * * *